(12) United States Patent
Harris et al.

(10) Patent No.: US 6,311,225 B1
(45) Date of Patent: Oct. 30, 2001

(54) METHOD AND APPARATUS FOR TRANSFERRING DATA BETWEEN PROCESS MODULES

(75) Inventors: Stephen James Harris, Ottawa; John Philip Brule, Spencerville; Hassan Mohamed Janoowalla, Ottawa; Jorge Fernando Cuervo-Carrillo, Dunrobin; Caroline Dawn Bachynski, Nepean, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/771,835

(22) Filed: Dec. 23, 1996

(51) Int. Cl.[7] .................................................... G06F 9/40
(52) U.S. Cl. ......................... 709/310; 709/312; 709/313; 707/104
(58) Field of Search .................. 714/15; 713/1; 709/101, 310, 312, 313, 315, 316, 328, 329; 707/10, 102, 104

(56) References Cited

U.S. PATENT DOCUMENTS

| | | | |
|---|---|---|---|
| 4,974,181 | 11/1990 | Sinderson et al. | 364/550 |
| 5,301,320 | * 4/1994 | McAtee et al. | 395/650 |
| 5,581,691 | * 12/1996 | Hsu et al. | 395/182.13 |
| 5,596,750 | * 1/1997 | Li et al. | 709/101 |
| 5,634,127 | * 5/1997 | Cloud et al. | 709/300 |
| 5,857,195 | * 1/1999 | Hayashi et al. | 707/102 |
| 5,918,226 | * 6/1999 | Tarumi et al. | 707/10 |

* cited by examiner

Primary Examiner—Viet D. Vu

(57) ABSTRACT

A method and apparatus for implementing a process having at least one process step, and for transferring data between process steps. The apparatus includes a processor and a processor-readable memory for storing first and second sets of instructions. The first set of processor-readable instructions is operable to provide at least one process module operable to implement at least one process step. The process module has at least one functional option and is operable to receive an input message including at least one input variable to be acted upon by the process module, and an identification of which of the functional options is to be rendered active during execution of the process module. The process module is further operable to provide an output message including at least one output variable produced by the process module and at least one status variable for providing a status indicator produced by the process module. The second set of processor-readable instructions is operable to cause the processor to define in the memory a form structure having a data definition portion defining input and output variables associated with the process, a data map portion defining message contents for use in the input message, and a step definition portion for associating the message contents with at least one process step.

49 Claims, 5 Drawing Sheets

$(A+B) \times E = G$

Process Sequence Definition:

Start : SA : SB : End

Associate ( Process_module (name1) ) → Process_step (SA)
Associate ( Process_module (name2) ) → Process_step (SB)

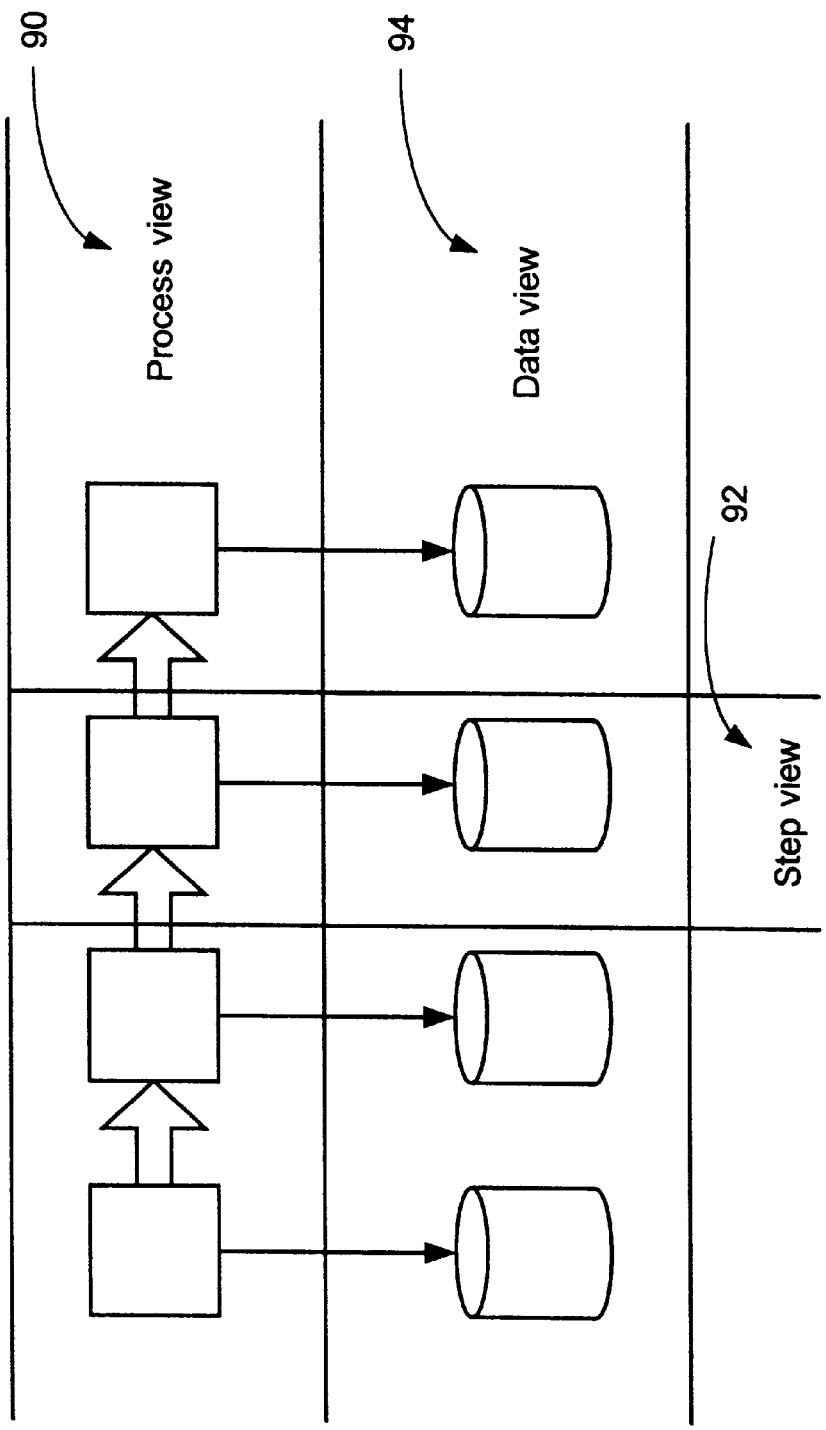

METHOD AND APPARATUS FOR TRANSFERRING DATA BETWEEN PROCESS MODULES

BACKGROUND OF THE INVENTION

This invention relates to methods and apparatus for transferring data, status information and programming information between individual process modules which comprise an overall process. It also relates to methods and apparatus for controlling a process using the above methods for transferring data, and for displaying data associated with the process and with individual process steps.

Software applications are designed to achieve specific goals. To achieve these goals a process must often be followed. That is, certain tasks must be done in a specific order. Processes can be lengthy and complex. They often spawn other processes, such that several sub-processes are run simultaneously. Managing the information needed and manipulated by these processes can be difficult. Process owners have very limited powers when it comes to managing processes, because they do not have access to sufficient information to understand process status, and hence cannot act effectively.

Many process-oriented applications allow the user to design and start a process, but offer no tracking mechanism to monitor progress with respect to the information and the user perspective. Specifically, these applications provide no mechanism in the software for reporting completion of the entire process, or of a process sequence. Some applications provide basic tracking by indicating which steps have been completed and which are in progress. However, while a process step is executing, there is no indication of how far it has progressed, what portion of its logic has been completed, or the reason it may be delayed.

SUMMARY OF THE INVENTION

In accordance with one aspect of the invention, there is provided a method of transferring data between process modules of an overall process. The method includes the steps of:
a) defining in memory a form having:
  i) a data definition portion defining input and output variables associated with the process;
  ii) a data map portion defining message contents;
  iii) a step definition portion for associating the message contents with respective process modules; and
b) providing to each of the process modules a respective input message having contents specified by the data map portion.

In accordance with another aspect of the invention, there is provided a method of implementing a process having at least one process step. The method includes the steps of:
a) defining, with a first set of processor-readable instructions, at least one process module operable to implement at least one of the process steps, the at least one process module having at least one functional option and being operable to receive an input message including at least one input variable to be acted upon by the at least one process module, and an identification of which of the at least one functional options is to be rendered active during execution of the at least one process module, the at least one process module being operable to provide an output message including at least one output variable produced by the at least one process module and at least one status variable for providing a status indicator produced by the process module;
b) defining in memory, with a second set of processor-readable instructions, a form structure having:
  i) a data definition portion defining input and output variables associated with the process;
  ii) a data map portion defining message contents for use in the input message;
  iii) a step definition portion for associating the message contents with at least one process step; and
c) providing input messages to the at least one process module.

In accordance with another aspect of the invention, there is provided an apparatus for implementing a process having at least one process step. The apparatus includes a processor and a processor-readable memory for storing first and second sets of instructions. The first set of processor-readable instructions is operable to provide at least one process module operable to implement at least one process step. The process module has at least one functional option and is operable to receive an input message including at least one input variable to be acted upon by the process module, and an identification of which of the functional options is to be rendered active during execution of the process module. The process module is further operable to provide an output message including at least one output variable produced by the process module and at least one status variable for providing a status indicator produced by the process module. The second set of processor-readable instructions is operable to cause the processor to define in the memory a form structure having a data definition portion defining input and output variables associated with the process, a data map portion defining message contents for use in the input message, and a step definition portion for associating the message contents with at least one process step. The second set of instructions is also operable to direct the processor to provide the input message to the process module.

Preferably, the second set of instructions includes instructions for directing a processor to produce a process sequence definition defining an order of execution of the process steps.

Preferably, the second set of instructions includes instructions for directing the processor to assign the at least one process module to at least one of the process steps.

Preferably, the second set of instructions includes instructions for directing the processor to assign functional options within each process module to respective process steps and store a functional option assignment in the step definition portion of the form.

Preferably, the second set of instructions includes instructions for directing the processor to determine from the process sequence definition a current process step to be executed as part of the process.

Preferably, the second set of instructions includes instructions for directing the processor to determine from the process module assignment a current process module assigned to the current process step.

Preferably, the second set of instructions includes instructions for directing the processor to determine from the functional option assignment a current functional option for invocation within the current process module.

Preferably, the second set of instructions includes instructions for directing the processor to include within the message an indication of the current functional option to be used within the current process module.

Preferably, the second set of instructions includes instructions for directing the processor to include within the message variables selected from the data definition portion.

Preferably, the first set of instructions includes instructions for directing the processor to execute the at least one functional option in response to the input message.

Preferably, the second set of instructions includes instructions for directing the processor to receive from the at least one process module, the output message and storing the output data variable in the data definition portion of the form.

Preferably, the second set of instructions includes instructions for directing the processor to display at least one of the input and output variables from the data definition portion.

In accordance with another aspect of the invention, there is provided a computer readable memory medium on which is stored a set of processor-readable instructions for defining a form structure in a computer memory, the form structure having a data definition portion defining input and output variables associated with a process, a data map portion defining message contents for use in an input message operable to be provided to a process module implementing at least one step in the process, a step definition portion for associating the message contents with at least one process step in the process. The set of instructions is also operable to direct a processor to provide the input message to the process module implementing said step in said process.

Preferably, the set of processor-readable instructions includes instructions for directing a processor to produce a process sequence definition defining an order of execution of the process steps.

Preferably, the set of processor-readable instructions includes instructions for directing a processor to assign the at least one process module to at least one of the process steps.

Preferably, the set of processor-readable instructions includes instructions for directing a processor to assign functional options within each process module to respective process steps and store a functional option assignment in the step definition portion of the form.

Preferably, the set of processor-readable instructions includes instructions for directing a processor to determine from the process sequence definition a current process step to be executed as part of the process.

Preferably, the set of processor-readable instructions includes instructions for directing a processor to determine from the process module assignment a current process module assigned to the current process step.

Preferably, the set of processor-readable instructions includes instructions for directing a processor to determine from the functional option assignment a current functional option for invocation within the current process module.

Preferably, the set of processor-readable instructions includes instructions for directing a processor to include within the message an indication of the current functional option to be used within the current process module.

Preferably, the set of processor-readable instructions includes instructions for directing a processor to include within the message variables selected from the data definition portion.

Preferably, the set of processor-readable instructions includes instructions for directing a processor to receive from the at least one process module, the output message and storing the output data variable in the data definition portion of the form.

Preferably, the set of processor-readable instructions includes instructions for directing a processor to display at least one of the input and output variables from the data definition portion.

In accordance with another aspect of the invention, there is provided an apparatus for transferring data between process modules of an overall process. The apparatus includes a processor-readable and writable memory configured to have a data definition portion defining input and output variables associated with the process, a data map portion defining message contents, a step definition portion for associating the message contents with respective process modules. The apparatus further includes a processor programmed with instructions to provide to each of the process modules a respective input message having contents specified by the data map portion.

Preferably, the instructions include instructions for directing a processor to include within the message contents a method definition defining a method to be used in the process module.

Preferably, the instructions include instructions for directing a processor to include within the message input and output variables selected from the data definition portion.

Preferably, the instructions include instructions for directing a processor to maintain a process sequence definition associating process steps with respective process modules and an order of execution of the process steps to complete the process.

Preferably, the instructions include instructions for directing a processor to pass the messages to respective the process modules to effect execution of the process modules in the order.

Preferably, the instructions include instructions for directing a processor to receive from the process modules respective messages, the respective messages including module output data, the module output data being stored in the data definition portion of the form.

Preferably, the instructions include instructions for directing a processor to display at least one of the input and output variables from the data definition portion.

BRIEF DESCRIPTION OF THE DRAWINGS

In drawings which illustrate embodiments of the invention,

FIG. 7 is a schematic representation of various views of data derived from the form structure shown in FIG. 6.

DETAILED DESCRIPTION

Figures 1, 2:
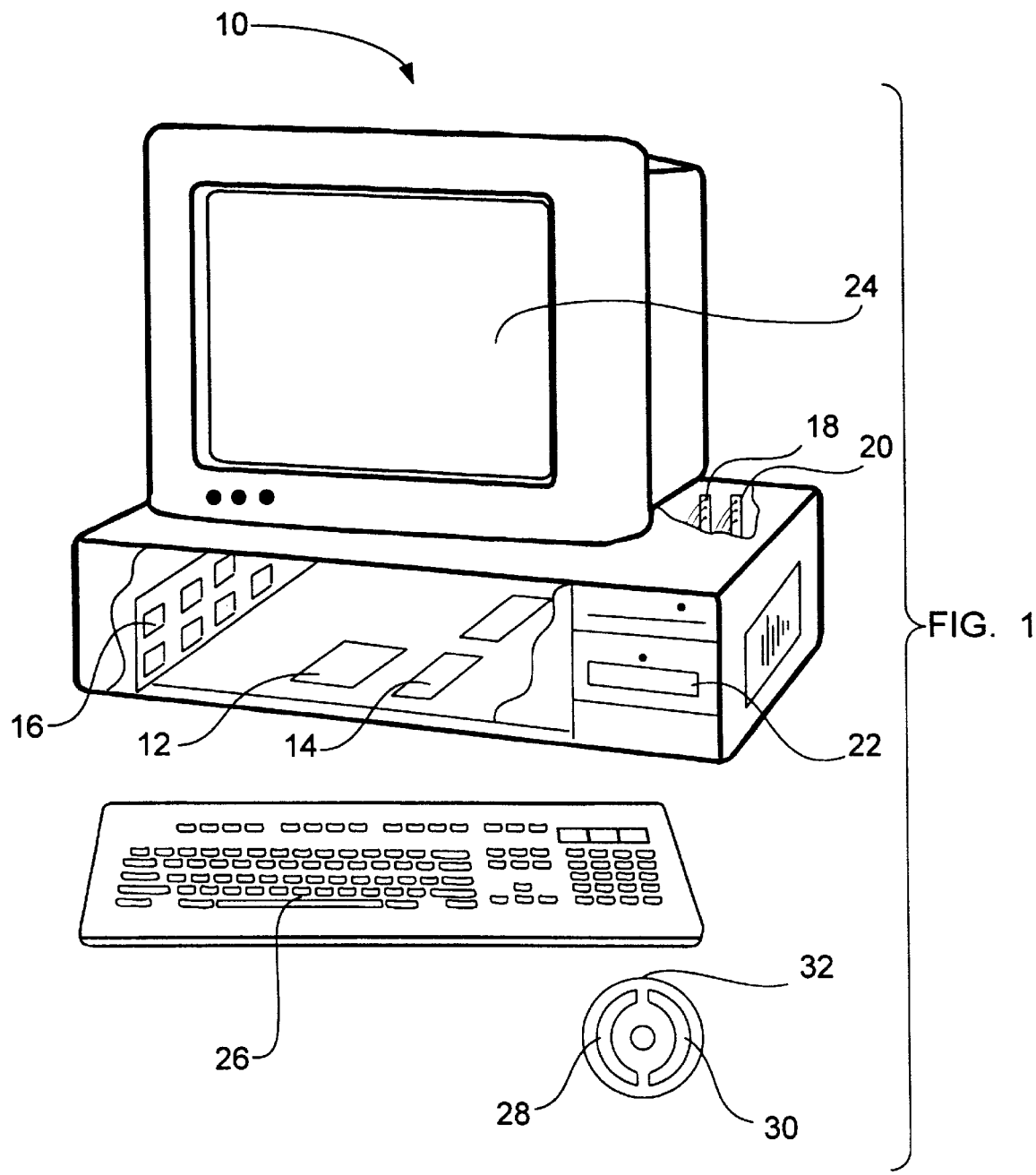
FIG. 1 is a perspective view of an apparatus according to a first embodiment of the invention.
FIG. 2 is a representation of an exemplary process according to the first embodiment of the invention.

Referring to FIG. 1, an apparatus for implementing a process is shown generally at 10 and includes a computer having a processor 12 operable to communicate with read only memory (ROM) 14, Random Access Memory (RAM) 16, input and output ports 18 and 20, a media reader 22, a display 24 and a keyboard 26 connected to the processor 12.

First and second sets of processor program instructions, that is, codes 28 and 30 are stored on computer or processor-readable media, which, in this embodiment is a compact disk read only memory (CDROM) 32. The CDROM 32 is read by the media reader 22 and the processor 12 is directed by system codes (not shown) stored in the ROM 14 to copy the first and second sets of processor program codes 28 and 30 into the RAM 16. The system codes then direct the processor 12 to execute the first and second sets 28 and 30 of processor program codes.

Referring to FIG. 2, in this embodiment the process is shown generally at 34 and is a simple two step process including a two input addition function 36 and a two input multiply function 38.

Figure 3:
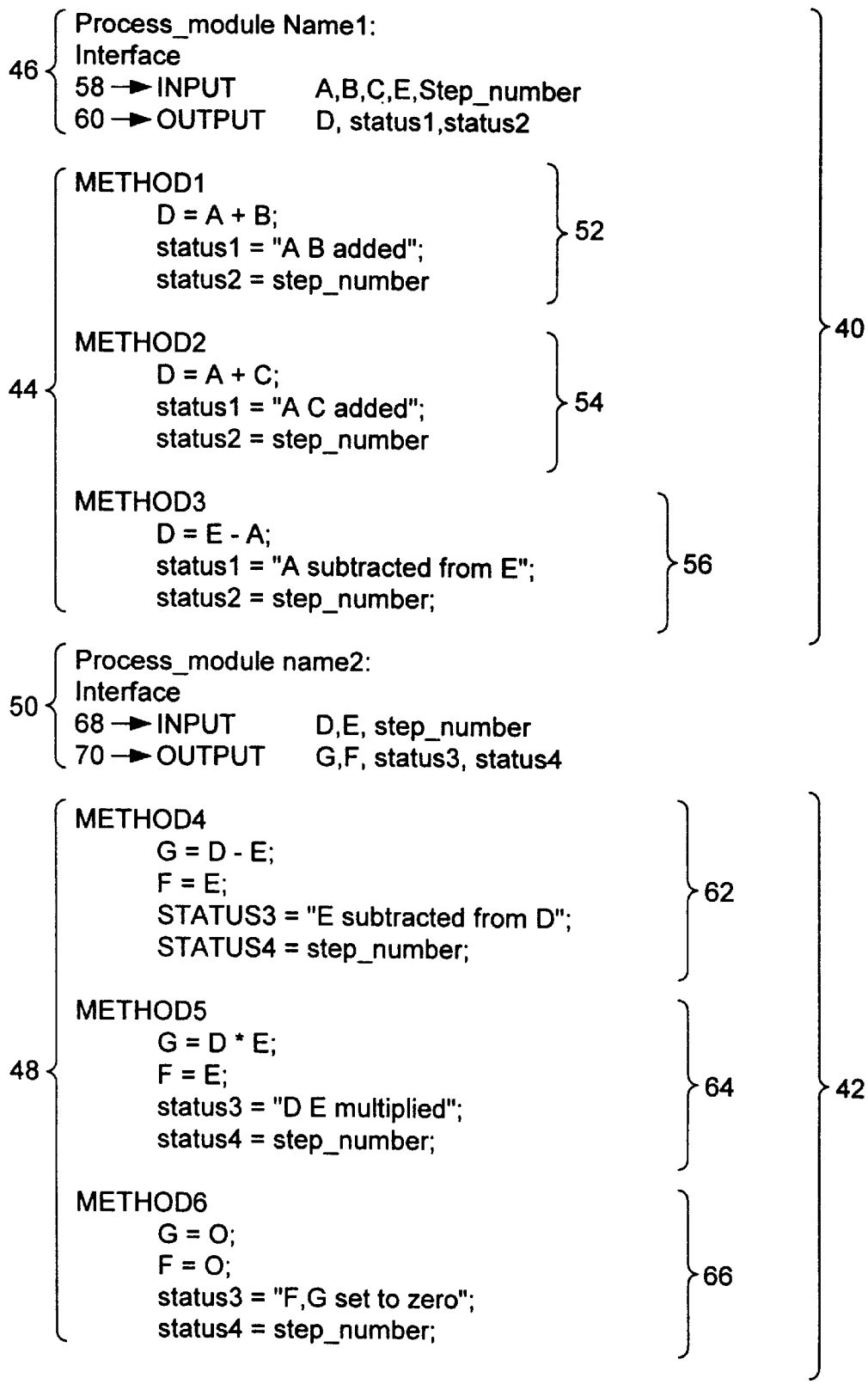
FIG. 3 is a representation of first and second process modules according to the first embodiment of the invention, for implementing the exemplary process.

Referring to FIG. 3, to implement the process, the first set of processor program codes 28 includes blocks of program codes defining respective process modules. In this embodiment, there are two blocks defining first and second process modules 40 and 42 respectively.

Each block includes program instructions selected using object oriented programming techniques such that the first module 40 includes a first functional portion 44 and a first interface portion 46 while the second module 42 includes a second functional portion 48 and a second interface portion 50.

The first functional portion 44 of the first module 40 includes first, second and third methods or procedures 52, 54 and 56, which define three separate functional relationships which operate on various inputs to the module. The first method 52 has inputs A, B and step_number, has outputs D, status1 and status2 and has functional capability to add A and B together and deposit the result in output D. In addition, status1 is assigned the string "A B added" and status2 is set equal to step_number.

The second method 54 has inputs A, C and step_number and has outputs D, status1 and status2 and has functional capability to add A and C together and deposit the result in output D. In addition, status1 is set equal to the string "A C added" and status2 is set equal to step_number.

The third method 56 has inputs A and E and step_number and has outputs D, status1 and status2 and has functional capability operable to subtract A from E and deposit the result in output D. In addition, status1 is set equal to the string "A subtracted from E" and status2 is set equal to step_number.

The first module 40 as a whole therefore, has inputs A, B, C and E and step_number and has outputs D, status1 and status2.

The first interface portion 46, specifies a first input message format 58 for messages passed to the first module 40 to supply data thereto and further specifies a first output message format 60 for messages produced by the module, for providing data to other routines or objects.

The second functional portion 48 of the second module 42 includes fourth, fifth and sixth methods 62, 64 and 66 which define three separate functional relationships which operate on various inputs to the module. The fourth method 62 has inputs D, E and step_number, outputs F, G, status3 and status4 and has functional capability to subtract E from D and deposit the result in output G. Status3 is assigned the string "E subtracted from D" and status4 is set equal to step_number.

The fifth method 64 has inputs D, E and step_number and has outputs F, G status3 and status4 and has functional capability to multiply D and E together and deposit the output in output G. In addition, output F is set equal to E, status3 is set equal to the string "D E multiplied" and status4 is set equal to step_number.

The sixth method 66 has only the step_number as input and has outputs F, G, status3 and status4 and has functional capability operable to set F and G equal to zero, set status3 equal to the string "F, G set to zero" and set status4 equal to step_number.

The second module 42 as a whole therefore, has inputs D, E, and step_number and has outputs F, G, status3 and status4.

The second interface portion 50, specifies a second input format 68 for messages passed to the second module to supply data to the second module 42 and further specifies a second output format 70 for messages produced by the second module 42, for providing data to other routines.

In effect therefore, there is defined with a first set of processor-readable instructions, at least one process module operable to implement at least one of the process steps. The process module has at least one functional option and is operable to receive an input message including at least one input variable to be acted upon by the process module, and is operable to receive an identification of which of the functional options is to be rendered active during execution of the process module. In addition, the process module is operable to provide an output message including at least one output variable and at least one status variable for providing a status indicator.

Referring back to FIG. 1, the second set of instructions 30 includes a process manager which is implemented in a process definition language, for example mechanisms defined by the Workflow Management Coalition. The process manager is aware of the first and second modules and the functionality provided by each method or procedure of those modules via publishing/subscribe mechanisms. Therefore, the user need only specify the desired process, shown in FIG. 2, to the process manager.

In response to a definition of a desired process, the process manager determines that the process can be executed by first and second process steps executed in cascade. In this embodiment, the first process step is the addition function 36 and the second process step is the multiply function 38 shown in FIG. 2.

Figure 4:
FIG. 4 is a representation of a process sequence definition according to the first embodiment of the invention.

Referring to FIG. 4, the process manager then defines a process sequence definition 72 to specify the steps of the process, in this embodiment, step A and step B, where step A is the addition function shown in FIG. 2 and step B is the multiplication function shown in FIG. 2. The process sequence definition defines an order of execution of the process steps.

Figure 5:
FIG. 5 is a representation of a module step definition assignment according to the first embodiment of the invention.

Referring to FIG. 5, a module step definition assignment 74 is then made to identify which of the modules will be responsible for which steps of the process. In this embodiment, the first module 40, is mapped to step A while the second module 42 is mapped to step B. Thus, the process modules are assigned to process steps.

In addition, the process manager obtains from the first and second interfaces 46 and 50 a general definition of inputs and outputs received and provided by each module.

Figure 6:
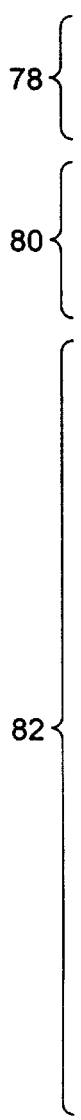
FIG. 6 is a representation of a form structure used to relate data, programming and status information relating to the process.

Referring to FIG. 6, to keep all of its knowledge of the process in a convenient form, the process manager defines, in the RAM, a form structure 76 comprising a data definition portion 78, a step definition portion 80 and a data map portion 82. The form structure facilitates the passing of data and messages to and from the first and second modules shown in FIG. 3, to carry out the process.

The data definition portion 78 includes a cumulative list of inputs that have a direct relationship with the inputs in the first and second modules 40 and 42. This relationship is determined by the process manager by reading the first and second interfaces 46 and 50 in FIG. 3. In addition, a cumulative list of the outputs that have a direct relationship to the outputs of the first and second modules is provided. This relationship is also determined by the process manager by reading the first and second interfaces. This list of inputs and outputs may be implemented in a variety of different data structures. Thus, the data definition portion defines input and output variables associated with the process.

Referring to FIGS. 3 and 6, the step definition portion 80 includes assignments 84 and 86 of message contents to respective process steps (36 and 38), that is, the relationships between the individual methods or functional options of the first and second modules 40 and 42 and the steps (36 and 38) in the process. As discussed above, the first method 52 is associated with process step A (36) and, therefore, message contents 88 associated with the first method 52 are associated with process step A (36). Similarly, the fifth method 64 is associated with process step B (38). Thus, the step definition portion associates functional options within each process module to respective process steps by associating message contents with respective steps of the process.

The data map portion 82 defines the message contents of messages sent by the process manager to the first and second modules to effect the functionality of each process step. In the example provided, the message contents 88 for the first method include inputs A1, B1 and SN while the message contents 89 for the fifth method include inputs D1, E1 and SN. In effect therefore, the data map portion defines a plurality of message contents for use in the input message provided to the process module.

Operation

Referring to FIG. 4, when the process is to be executed, the process manager determines from the process sequence definition 72 that step A is the first step to be performed. Thus, the first step is the current process step to be executed as part of the process. Referring to FIG. 5, the process manager determines from the process module assignment that the first module 40 in FIG. 3 is associated with process step A. Thus, the first module 40 is the current module assigned to the current process step. Referring to FIG. 6, the process manager then determines from the functional option assignment in the step definition portion 80 that the message contents 88 associated with the first method are to be associated with process step A. Thus, the first method is the current functional option for invocation within the current process module. Referring to FIGS. 3 and 6, the process manager forwards an input message to the first module 40, including inputs A1, B1, and SN from the data definition portion 78 and an indication of the current functional option to be used within the current process module. Thus there is included within the input message a method definition defining a method to be used in the process module. Assume that upon invoking the process the inputs A1, B1, C1, E1 and SN are set to 1, 2, 3, 4 and 1 respectively. These are initial values. The passing of the message to the first module invokes the first method 52 of the first module 40 to the exclusion of the second and third methods, whereupon inputs A and B are added together (1+2) with the result (3) being deposited in output D.

In addition, the status1 variable is set to string "A B added" and the status2 variable is set equal to SN, which at this point, is 1. The module passes the outputs D, status1 and status2 back to the process manager in the first output message format defined by the first interface 46. Thus, the selected functional option is executed in response to the input message. Upon receiving the output message from the first module 40, the process manager increments SN to 2.

The process manager then updates the form structure 76 with data produced by the first process module. The input values A1, B1, C1, E1 are unchanged, however, SN is now 2, D1 is now 3, S1 is equal to the string "AB Added", S2 is equal to 1 and the remaining outputs F1, G1, S3, and S4 remain unchanged. Thus the output message is received from the first process module, and output data variables produced by the process module are stored in the data definition portion of the form structure.

The process manager then refers back to the process sequence definition 72 shown in FIG. 4 and determines that step B is the next step in the process.

Referring to FIG. 5, the process manager then refers back to the module assignment 74 which informs the process manager that the second module is associated with step B. Referring to FIG. 6, the process manager then refers to the form structure 76 and finds the assignment 86 between process step B and the fifth method (64). The process manager then places data map message contents 89 associated with the fifth method in the second input message format which includes inputs D1, E1 and SN having values 3, 4 and 2 respectively. The message is then passed to the second module.

Referring to FIG. 3, at the second module 42, the fifth method 64 is carried out to the exclusion of the fourth and sixth methods 62 and 66. By this method, the contents of variables D and E are multiplied together with the result being deposited in output G. As variable D is equal to 3, and as variable E is equal to 4, the contents of output G are set to 12. In addition, variable F is set equal to the contents of variable E, ie. 4, output status3 is set equal to the string "D E multiplied" and status4 is set equal to the step_number, in this instance 2. The second module 42 then passes a second output message back to the process manager. The process manager then increments the SN to 3 and updates the form structure by changing the value of G1 to 12, changing the value of F1 to 4, changing S3 equal to the string "D E multiplied" and changing S4 to 2. The process manager then refers back to the process sequence definition 72 in FIG. 4 and finds that the process is ended and no further action is required to execute the process. The process is thus completed and the form structure 76 in FIG. 6 contains new values for data variables D1, F1, G1, S1, S2, S3 and S4 produced by the process.

It will be appreciated that the input messages are passed to respective process modules to effect execution of the process modules in the order dictated by the process sequence definition. In addition, respective messages are received from the process modules, the respective messages including module output data, the module output data being stored in the data definition portion of the form structure.

At any given time, the form structure 76 contains information relating to the inputs and outputs of the process as well as intermediate inputs and outputs to each step in the process, and contains information as to the status of each step in the process. Also, the form structure contains key data, in the form of the step definition portion 80 which selects certain functional options of each process module involved in executing the overall process. Effectively, the form structure creates a relationship between diverse pieces of information associated with a process.

The use of the form structure 76 in association with a process facilitates easy gathering of information about a process. The form structure thus acts as a method of transferring data between process modules of an overall process. This is particularly useful where the process involves tens or hundreds of complex steps such as the process of completing a change order in a central office of a public telephone network.

Referring to FIG. 7, to facilitate the display of information relating to the process, the process manager is provided with instructions operable to direct the processor to retrieve data, or at least one of the input and output variables, from the data definitions portion of the form and display such data on the display 24 shown in FIG. 1. Generally, the display of data can be categorized into process view 90, a step view 92 and a data view 94.

The process view 90 provides a viewer with a view of the entire process. This is accomplished by displaying, for example, inputs A1, B1, E1, and outputs G1 and S3. This provides the viewer with an overall perspective of the process and enables easy comprehension of what steps have been completed and what steps remain to be completed.

The step view 92 provides the viewer with information about an individual process step. Assuming the viewer wishes to view the first step, this is accomplished by displaying the contents of inputs A1, B1 and SN output D1 and the S1 and S2 data. The viewer can thus readily see what part of the process step is being executed, and the input used or produced by the process step.

The data view 94 provides the viewer with a display of the data used by the process. To facilitate this, all inputs A1, B1, C1, D1, E1 and SN and outputs D1, F1, G1, S1, S2, S3 and S4. This allows the viewer to learn which pieces of data are affected by the process, which have been assigned their final value, which pieces of data are missing and the source of each piece of data.

While specific embodiments of the invention have been described and illustrated, such embodiments should be considered illustrative of the invention only and not as limiting the invention as construed in accordance with the accompanying claims.

What is claimed is:

1. A method of transferring data between process modules of an overall process, the method comprising:
   a) defining in memory a form structure having:
      i) a data definition portion defining input and output variables associated with said process;
      ii) a data map portion defining message contents;
      iii) a step definition portion for associating said message contents with respective process modules;
   b) providing to each of said process modules a respective input message having contents specified by said data map portion; and
   c) updating said data definition portion with data produced by at least one of said process modules.

2. A method as claimed in claim 1 further comprising including within said message contents a method definition defining a method to be used in said process module.

3. A method as claimed in claim 2 further comprising including within said message input and output variables selected from said data definition portion.

4. A method as claimed in claim 1 further comprising maintaining a process sequence definition associating process steps with respective process modules and an order of execution of said process steps to complete said process.

5. A method as claimed in claim 4 further comprising passing said messages to respective said process modules to effect execution of said process modules in said order.

6. A method as claimed in claim 5 further comprising receiving from said process modules respective messages, said respective messages including module output data, said module output data being stored in said data definition portion of said form structure.

7. A method as claimed in claim 1 further comprising displaying at least one of said input and output variables from said data definition portion.

8. A method of implementing a process having at least one process step, the method comprising:
   a) defining, with a first set of processor-readable instructions, at least one process module operable to implement at least one of said process steps, said at least one process module having at least one functional option and being operable to receive an input message including at least one input variable to be acted upon by said at least one process module, and an identification of which of said at least one functional options is to be rendered active during execution of said at least one process module, said at least one process module being operable to provide an output message including at least one output variable produced by said at least one process module and at least one status variable for providing a status indicator produced by said process module;
   b) defining in memory, with a second set of processor-readable instructions, a form structure having:
      i) a data definition portion defining input and output variables associated with said process;
      ii) a data map portion defining message contents for use in said input message;
      iii) a step definition portion for associating said message contents with at least one process step; and
   c) providing said input message to said at least one process module; and
   d) updating said data definition portion with data produced by said at least one process module.

9. A method as claimed in claim 8 further comprising producing a process sequence definition defining an order of execution of said process steps.

10. A method as claimed in claim 9 further comprising assigning said at least one process module to at least one of said process steps and storing a process module assignment in said memory.

11. A method as claimed in claim 10 further comprising assigning functional options within each process module to respective process steps and storing a functional option assignment in said step definition portion of said form structure.

12. A method as claimed in claim 11 further comprising determining from said process sequence definition a current process step to be executed as part of said process.

13. A method as claimed in claim 12 further comprising determining from said process module assignment a current process module assigned to said current process step.

14. A method as claimed in claim 13 further comprising determining from said functional option assignment a current functional option for invocation within said current process module.

15. A method as claimed in claim 14 further comprising including within said input message an indication of the current functional option to be used within said current process module.

16. A method as claimed in claim 15 further comprising including within said input message variables selected from said data definition portion.

17. A method as claimed in claim 16 further comprising executing said at least one functional option in response to said input message.

18. A method as claimed in claim 17 further comprising receiving from said at least one process module, said output message and storing said output variable in said data definition portion of said form structure.

19. A method as claimed in claim 18 further comprising displaying at least one of said input and output variables from said data definition portion.

20. An apparatus for transferring data between process modules of an overall process, the apparatus comprising:
   a) a processor-readable and writable memory configured to have:
      i) a data definition portion defining input and output variables associated with the process;
      ii) a data map portion defining message contents;
      iii) a step definition portion for associating the message contents with respective process modules; and
   b) a processor programmed with instructions to provide to each of the process modules a respective input message having contents specified by the data map portion and programmed to update said data definition portion in response to output messages produced by each of the process modules.

21. An apparatus as claimed in claim 20 wherein said instructions comprise instructions for directing said processor to include within the message contents a method definition defining a method to be used in the process module.

22. An apparatus as claimed in claim 21 wherein said instructions comprise instructions for directing said processor to include within the message input and output variables selected from the data definition portion.

23. An apparatus as claimed in claim 22 wherein said instructions comprise instructions for directing said processor to maintain a process sequence definition associating process steps with respective process modules and an order of execution of the process steps to complete the process.

24. An apparatus as claimed in claim 23 wherein said instructions comprise instructions for directing said processor to pass the messages to respective the process modules to effect execution of the process modules in the order.

25. An apparatus as claimed in claim 24 wherein said instructions comprise instructions for directing said processor to receive from the process modules respective messages, the respective messages including module output data, the module output data being stored in the data definition portion.

26. An apparatus as claimed in claim 25 wherein said instructions comprise instructions for directing said processor to display at least one of the input and output variables from the data definition portion.

27. A apparatus for implementing a process having at least one process step, the apparatus comprising:
   a) processor-readable memory for storing:
      i) a first set of processor-readable instructions operable to provide at least one process module operable to implement said at least one process steps, said at least one process module having at least one functional option and being operable to receive an input message including at least one input variable to be acted upon by said at least one process module, and an identification of which of said at least one functional options is to be rendered active during execution of said at least one process module, said at least one process module being operable to provide an output message including at least one output variable produced by said at least one process module and at least one status variable for providing a status indicator produced by said process module;
      ii) a second set of processor-readable instructions, for:
         A) defining a form structure in a second memory, said form structure having:
            1) a data definition portion defining input and output variables associated with the process;
            2) a data map portion defining message contents for use in the input message;
            3) a step definition portion for associating the message contents with at least one process step; and
         B) providing said input message to said at least one process module;
         C) updating said data definition portion with data produced by said at least one process module; and
   b) a processor operable to be directed by said first and second sets of instructions.

28. An apparatus as claimed in claim 27 wherein said second set of instructions comprises instructions for directing said processor to produce a process sequence definition defining an order of execution of said process steps.

29. An apparatus as claimed in claim 28 wherein said second set of instructions comprises instructions for directing said processor to assign said at least one process module to at least one of said process steps and to store in said second memory a process module assignment.

30. An apparatus as claimed in claim 29 wherein said second set of instructions comprises instructions for directing said processor to assign functional options within each process module to respective process steps and store a functional option assignment in said step definition portion of said form structure.

31. An apparatus as claimed in claim 30 wherein said second set of instructions comprises instructions for directing said processor to determine from said process sequence definition a current process step to be executed as part of said process.

32. An apparatus as claimed in claim 31 wherein said second set of instructions comprises instructions for directing said processor to determine from said process module assignment a current process module assigned to said current process step.

33. An apparatus as claimed in claim 32 wherein said second set of instructions comprises instructions for directing said processor to determine from said functional option assignment a current functional option for invocation within said current process module.

34. An apparatus as claimed in claim 33 wherein said second set of instructions comprises instructions for directing said processor to include within said input message an indication of said current functional option to be used within said current process module.

35. An apparatus as claimed in claim 34 wherein said second set of instructions comprises instructions for directing said processor to include within said input message variables selected from said data definition portion.

36. An apparatus as claimed in claim 35 wherein said first set of instructions comprises instructions for directing said processor to execute said at least one functional option in response to said input message.

37. An apparatus as claimed in claim 36 wherein said second set of instructions comprises instructions for directing said processor to receive from said at least one process module, said output message and store said output variable in said data definition portion of said form structure.

38. An apparatus as claimed in claim 37 wherein said second set of instructions comprises instructions for directing said processor to display at least one of said input and output variables from said data definition portion.

39. A computer readable memory medium on which is stored a set of processor-readable instructions, for:
   a) defining a form structure in a computer memory, said form structure having:
      1) a data definition portion defining input and output variables associated with a process;

2) a data map portion defining message contents for use in an input message operable to be provided to a process module implementing at least one step in said process;

3) a step definition portion for associating the message contents with at least one process step in said process; and b) providing said input message to said process module implementing said at least one step in said process; and c) updating said data definition portion with data produced by said process module.

40. A computer readable memory medium as claimed in claim 39 wherein said set of processor-readable instructions comprises instructions for directing a processor to produce a process sequence definition defining an order of execution of said process steps.

41. A computer readable memory medium as claimed in claim 40 wherein said set of processor-readable instructions comprises instructions for directing said processor to assign said at least one process module to at least one of said process steps and to store in said computer memory a process module assignment.

42. A computer readable memory medium as claimed in claim 41 wherein said set of processor-readable instructions comprises instructions for directing said processor to assign functional options within each process module to respective process steps and store a functional option assignment in said step definition portion of said form structure.

43. A computer readable memory medium as claimed in claim 42 wherein said set of processor-readable instructions comprises instructions for directing said processor to determine from said process sequence definition a current process step to be executed as part of said process.

44. A computer readable memory medium as claimed in claim 43 wherein said set of processor-readable instructions comprises instructions for directing said processor to determine from said process module assignment a current process module assigned to said current process step.

45. A computer readable memory medium as claimed in claim 44 wherein said set of processor-readable instructions comprises instructions for directing said processor to determine from said functional option assignment a current functional option for invocation within said current process module.

46. A computer readable memory medium as claimed in claim 45 wherein said set of processor-readable instructions comprises instructions for directing said processor to include within said message an indication of said current functional option to be used within said current process module.

47. A computer readable memory medium as claimed in claim 46 wherein said set of processor-readable instructions comprises instructions for directing said processor to include within said message variables selected from said data definition portion.

48. A computer readable memory medium as claimed in claim 47 wherein said set of processor-readable instructions comprises instructions for directing said processor to receive from said at least one process module, an output message including at least one output variable produced by said at least one process module and storing said output variable in said data definition portion of said form structure.

49. A computer readable memory medium as claimed in claim 48 wherein said set of processor-readable instructions comprises instructions for directing said processor to display at least one of said input and output variables from said data definition portion.

* * * * *